Dec. 9, 1924.
G. G. BROWN, JR
CARBURETOR
Filed May 28, 1921
1,518,559
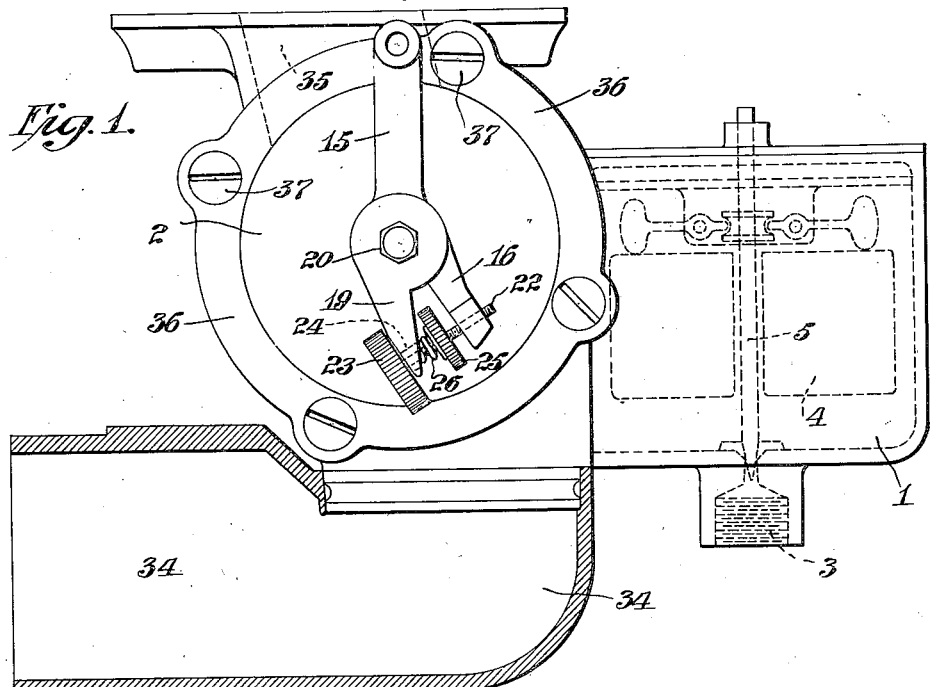
INVENTOR
George G. Brown Jr.
BY
Rosenbaum, Stockbridge & Koret
ATTORNEYS.

Patented Dec. 9, 1924.

1,518,559

UNITED STATES PATENT OFFICE.

GEORGE G. BROWN, JR., OF ANN ARBOR, MICHIGAN.

CARBURETOR.

Application filed May 28, 1921. Serial No. 473,249.

*To all whom it may concern:*

Be it known that I, GEORGE G. BROWN, Jr., a citizen of the United States, residing at Ann Arbor, in the county of Washtenaw and State of Michigan, have invented certain new and useful Improvements in Carburetors, of which the following is a full, clear, and exact description.

This invention relates to carburetors for hydrocarbon fuels and particularly to the fuel and air regulating mechanism thereof.

A gas engine develops its maximum efficiency when burning mixtures in which the air to fuel ratio is high, the higher this ratio the greater is the efficiency provided that the velocity of combustion is sufficiently great to cause a complete burning of the gas within the cylinder. Since the velocity of combustion increases with an increase in temperature, it follows that leaner mixtures, that is, mixtures in which the air to fuel ratio is higher, can be exploded with increased efficiency if full advantage is taken of a preheated air supply, heated manifold, etc. If, for any reason, the temperature of the mixture or the air supply becomes lower, the velocity of combustion is decreased with the likelihood of resultant back-firing and misfiring, causing loss in power and in efficiency and annoyance to the motorists. For the most efficient utilization of the fuel it is necessary to increase the air to fuel ratio with an increase in temperature and to decrease the ratio with a decrease of temperature.

Since a unit weight of air at a given temperature, occupies a larger volume when at a higher temperature, it is necessary to supply a larger volume of air (or relatively a smaller volume of fuel) at higher temperatures in order to keep the air to fuel ratio constant. In order to obtain the highest possible efficiency at increased temperatures it is necessary to admit a larger volume of air (or smaller volume of fuel) than that necessary to maintain the air to fuel ratio constant.

The object of this invention is to provide an improved carburetor which automatically compensates for the variations in weight of air with changing temperature thereof, and in which the ratio of air to fuel is automatically varied with variations in temperature so as to maintain the most efficient ratio of air to fuel under various operating conditions and compensate for the varying density of air with varying temperatures; which may be advantageously employed in conjunction with or independently of automatic means for varying the ratio of air to fuel in proportion to the variations in speed of the engine; which may vary the ratio of air to fuel by regulating either the fuel or air supply, or both; which regulation or variation of the ratio may be accomplished without interfering with the usual manual regulation of air and fuel; and which is exceptionally simple, durable, reliable, efficient and inexpensive.

Other objects and advantages will be apparent from the following description and the novel features of the invention will be particularly pointed out in claims.

The invention contemplates utilizing variations in the temperature of the mixture or incoming air to restrict or enlarge the air or fuel passages, or both, upon a variation in temperature, the regulation of the passages being accomplished through the medium of a thermostatic unit which may be disposed in a conduit through which the air or mixture passes. The invention also comprises certain details and arrangements of parts which will be more particularly pointed out in the following description of applications of the invention to practice.

In the drawings:

Fig. 1 is an elevation partly in section of a carburetor to which my invention is applied;

Fig. 2 is a sectional elevation of the same, in which the thermostatic unit is adapted to control the fuel supply, and Fig. 3 is a sectional elevation of a carburetor constructed in accordance with the invention, but in which the thermostatic unit controls the air supply.

The invention is illustrated as applied to a carburetor of the type disclosed in the U. S. patent to Breath No. 1,153,891, September 21, 1915 but obviously it may be employed with other types of carburetors.

The float chamber 1 is located at one side of the casing 2 of the mixing or valve chamber and receives the fuel from the storage tank through the conduit connection 3, the liquid fuel being maintained at substantially a constant level by the float 4 and the valve 5 which is controlled thereby. A branch (not shown) leads from the float chamber 1 to the passage 6, the latter having at its upper end a port 7. This port opens into a tapered hole 8 of the casing in which is rotatably mounted a tubular valve element 9 having a tapered nose fitting therein, and also having a port 7ª which co-operates with the port 7 to vary the flow of fuel through the passage in accordance with the angular adjustment of the element 9. A cylinder 10 having an air inlet aperture 11 and a mixture outlet aperture 12 in its periphery is mounted within the casing 2 for rotation in grooves 13 upon the inner walls of the casing and about an axis concentric with that of the valve element 9. The cylinder upon one end has a hollow hub 14 which extends through one face of the casing and bears therein, and fixedly carries upon its outer end the arms 15 and 16. A tubular sleeve 17 with a closed outer end is rotatably mounted within the hub 14 and is provided upon its inner end with an enlargement 18 for preventing outward movement thereof and fixedly carries upon its outer end the arm 19. The cylinder and the tubular sleeve 17 may be locked by the nut 20 so that the whole turns as a unit when arm 15 is moved. The valve element 9 bears at one end within the enlargement 18 of the sleeve 17, the element 9 being keyed to the sleeve for rotation therewith and sliding movement relatively thereto in an endwise direction by a pin 9ª carried by the element 9 and disposed in axially elongated slots 18ª in the enlargement 18. The element 9 is yieldingly held within its valve seat or hole 8 by a spring 21 which is compressed between the closed end of the sleeve and the element 9. The rotation of the valve element to cover and uncover the port 7 to varying extents may thus be accomplished by rotation of the arm 19.

A threaded stem 22 of a screw 23 passes through a slightly elongated aperture 24 in the end of the arm 19 and has threaded engagement with the free end of the arm 16, a nut 25 and spring 26 upon the stem between the arms serving to hold the arm 19 against the head of the screw 23. By rotation of the screw the arms 16 and 19 can be caused to approach or separate, and thus the effective passage through the port 7 may be varied with respect to the air passage which is controlled by the aperture 11 of the cylinder through the manual operation of the cylinder by the arm 15. The valve element 9 is provided in its interior with an opening 27 in which is disposed a governor element 28 that reciprocates endwise of the valve element 9 and has a frustro-conical portion which restricts the effective area of the opening 27 by an amount corresponding to the section of the frustro-conical portion of the governor element which happens to be within the opening at any point in the endwise movement of the governor element. A block 29 is slidably disposed within the valve element 9 and a spring 30 is compressed between the block and the governor element 28 so as to yieldingly press the governor element to the right (Fig. 1) against a stop 28ª and provide the maximum effective area of the opening 27. A bimetallic thermostat 31 which is constructed of two strips of metal secured together, the strip on one side having a low co-efficient of expansion and the strip of metal upon the other side having a higher co-efficient of expansion, is secured at one end to the side of the valve element 9 by the pin 9ª and at its other end passes through a slot 32 in the element 9 and rests in a socket in block 29. Upon an increase in temperature the thermostat strip 31 will curl up in a direction to move block 29 toward the left (Figure 2) and permit of an expansion of spring 30. This expansion lessens the stress of the spring, and the suction created within the casing 2 by its connection to the intake valve of the engine will have less resistance to overcome in moving the governor element 28 in a direction to restrict the opening 27. Upon a decrease in temperature the thermostat uncurls and by moving block 29 to the right (Fig. 2) compresses the spring 30 an amount proportional to the decrease in temperature. With the greater stress in the spring 30, the suction within the cylinder 10 will have a greater force to overcome in shifting the valve in a direction to restrict the opening 27. The portion of the valve element 9 within the cylinder 10 is provided with a plurality of apertures 33 which permit of communication between the interior of the valve element 9 and the interior of the casing and cylinder. The air is conducted to the casing through the intake conduit 34 and after passing through the aperture 11 and mixing with the fuel within the cylinder 10 leaves by aperture 12 of the cylinder and the conduit 35. The face of the casing 2 through which the hub of the cylinder extends is removable therefrom and is secured in place by the ring 36 clamped to the casing by screws 37 and overlapping at its inner edge with the removable face.

In operation the screw 23 may be operated to relatively adjust the ports 7 and 7ª of the fuel supply conduit with respect to a given adjustment of the air inlet aperture 11 and mixture outlet 12, and the parts locked in adjusted position by a tightening of nut 20. As the arm 15 is shifted to admit more or less air to the cylinder 10 through the intake 34 the valve element 9 will be operated to vary the ports 7 and 7ª of the fuel passage simultaneously and proportionately. The suction in the outlet conduit 35 which causes the air to enter the cylinder 10 through the intake causes a movement of the governor element 28 toward the left (Fig. 2) against the action of the spring 30 so as to restrict the effective area of the opening 27 and thus also restrict the amount of fuel which may pass. The stronger the suction and in consequence the stronger the flow of fuel the greater will be the restriction of the opening 27 through which the fuel passes in entering the cylinder 10. When the engine slows down under load the suction will be less and the spring 30 will force the governor element 28 to the right (Fig. 2) and thereby enlarge the effective area of the opening 27. This arrangement, therefore, automatically restricts the flow of fuel in accordance with the variations in speed of the engine since the greater the speed of the engine the greater the suction in the intake conduit. In addition the operation of the thermostat 31 varies the compression of the spring and therefore operates to cause a restriction of the effective area of the opening 27 upon an increase in temperature and to cause an enlargement of the same upon a decrease in temperature. The thermostat, if properly calibrated, will enable a carburetor to provide the most economical mixture for all conditions resulting from a variation in temperature.

The casing may also be provided with a seat 38 upon its lower peripheral portion in which a valve member 39 is slidable peripherally of the cylinder and casing. This valve element by sliding within the seat 38 and projecting to varying extents across the intake conduit restricts the effective area thereof independently of the restriction or enlargement due to that caused by the movement of the aperture 11 of the cylinder 10. A bimetallic thermostat 40, similar in construction to the thermostat 31 may be secured at one end to the intake passage with its free end in operative engagement with the slidable valve member 39. With this arrangement an increase in temperature of the area within the intake conduit will cause the thermostat 40 to uncurl and shift the valve member 39 in a direction to enlarge the effective area of the intake to the cylinder and thereby admit a larger volume of air. With a decrease in temperature a reverse movement occurs, valve member 39 being shifted across the intake port so as to restrict the same and admit a less volume of air to the mixing chamber within the cylinder.

The carburetor may be constructed with either one or both of the thermostat controlled devices, but only one is necessary to accomplish the results desired. The thermostat devices of either type may be readily incorporated into almost all types of carburetors including those which also have a device for controlling the flow of fuel in accordance with changes in speed of the engine, as illustrated and described above.

Obviously various other changes in the details and arrangements of parts may be made by those skilled in the art within the principle and scope of the invention as set forth in the appended claims.

I claim:

1. In a carburetor, a casing having a mixing chamber with air and fuel inlets leading thereto and a mixture outlet leading therefrom, means for manually controlling the flow of oil and air through said passages respectively, an additional valve in the fuel inlet conduit responsive to changes in suction in the intake manifold for modifying the fuel supply admitted through the fuel inlet, and thermally-responsive means for modifying the operation of the additional valve in accordance with changes in temperature.

2. In a carburetor, a casing having a fuel inlet, a main controlling valve in the fuel inlet for controlling the quantity of fuel admitted to the casing, an additional valve in said fuel inlet which is movable in a direction to partially restrict the fuel passage when suction is created in the casing, a spring device opposing the passage restricting movement of the additional valve, and normally holding the latter in a position in which it offers the least restriction to the flow of fuel through the fuel inlet, and a thermally-responsive device for varying the stress in the spring in accordance with variations in temperature.

In witness whereof, I hereunto subscribe my signature.

GEORGE G. BROWN, Jr.